May 12, 1970     A. A. SPINOLA     3,511,777
METHOD OF NEUTRALIZING ACID WASTE WATER
Filed Aug. 11, 1969     3 Sheets-Sheet 1

INVENTOR.
ANTHONY A. SPINOLA
By
Attorney

INVENTOR.
ANTHONY A. SPINOLA
By
Attorney

INVENTOR.
ANTHONY A. SPINOLA
By
Attorney

United States Patent Office 3,511,777
Patented May 12, 1970

3,511,777
METHOD OF NEUTRALIZING ACID WASTE WATER
Anthony A. Spinola, Penn Hills Township, Allegheny County, Pa., assignor to United States Steel Corporation, a corporation of Delaware
Continuation-in-part of application Ser. No. 729,517, May 16, 1968. This application Aug. 11, 1969, Ser. No. 848,943
Int. Cl. C02c 5/16
U.S. Cl. 210—49  12 Claims

ABSTRACT OF THE DISCLOSURE

Acid waste waters, such as mine drainage of specified composition and spent pickle liquor, are neutralized by the addition thereto of solids of specified composition collected from the gases discharged from a kiln used in making cement clinker to produce a sludge product including neutralized acid water and a sludge of specified composition.

---

This application is a continuation in part of application Ser. No. 729,517 filed May 16, 1968, by applicant, and now abandoned.

This invention relates to a method of neutralizing acid waste waters, such as mine drainage and spent pickle liquor or the like.

BACKGROUND OF THE INVENTION

Stream pollution by acid waste waters is a problem of long standing. Neutralization by lime is the only practical method proposed so far, but this method has serious disadvantages. It is costly and slow, i.e., the sludge resulting from neutralization does not settle rapidly and, when it is collected, it presents a serious disposal problem because it is hard to handle, being of low density and slimy character.

The most pertinent prior art known to me is "Disposal of Spent Sulfate Pickling Solutions," by R. D. Hoak, published October 1952 by the Ohio River Valley Sanitation Commission, particularly Table 5, page 36; U.S. Pat. No. 1,672,584 issued June 5, 1928, C. F. Gurnham "Principles of Industrial Waste Treatment," 1955 John Wiley & Sons, N.Y. pp. 177–180; and U.S. Pat. No. 3,347,787 issued Oct. 17, 1967.

OBJECTS OF THE INVENTION

The object of the present invention is to provide an improved method of neutralizing acid waste waters or acid mine drainage, which method:

(a) Provides a cheaper neutralizing agent than conventional lime;
(b) Produces a more compact sludge than the sludge volume produced with lime;
(c) Produces a sludge which can be filtered and readily separated from the sludge slurry;
(d) Provides a filtered sludge which can be reused for a soil conditioner or for raw material for the manufacture of cement or the like;
(e) Provides a sludge from which iron and sulphur may be recovered; and
(f) Utilizes a dry feed.

SUMMARY OF THE INVENTION

Figure 1:
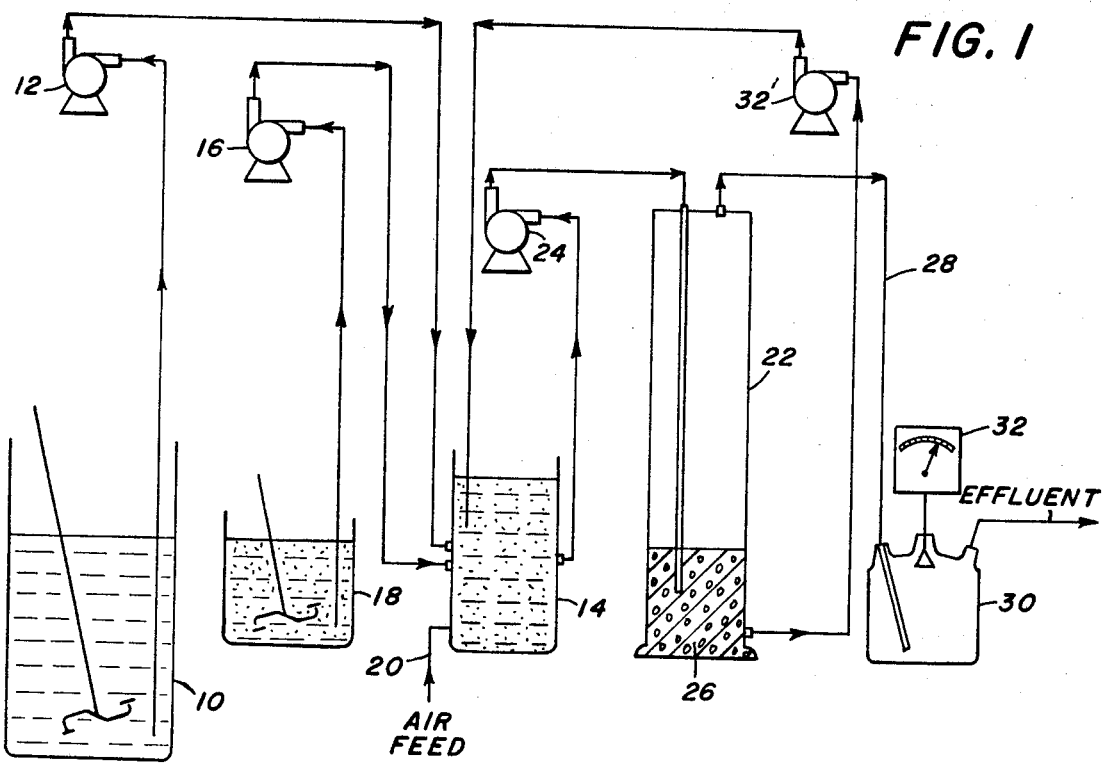
FIG. 1 is a schematic view of a pilot plant for neutralizing acid mine drainage with cement-kiln flue dust.

I have discovered that a readily available industrial-waste product has exceptionally good qualities for the neutralization of acid waste waters. The product is the solids or dust separated from the flue gases discharged from a cement-clinker kiln. It is low in cost, highly effective, rapid in action and results in a small volume of sludge which can easily be handled. My process involves only the addition to the waters to be neutralized, of an appropriate amount of cement-kiln flue-dust, and agitating the mixture or simply permitting it to stand until neutralization is complete.

DETAILED EXPLANATION OF THE PREFERRED PRACTICE

In the preferred practice of my method, I add to acid waste waters the solids or dust collected from the flue gases discharged by a cement-clinker kiln. This product has an alkalinity varying from plant to plant and the amount thereof needed to neutralize a given batch of waste waters varies accordingly. The acidity of the waste waters is a further factor determining the requirement of dust for neutralization. Whether complete neutralization is desired or only partial, introduces a further variable. Even slight reduction of the acidity of waste waters reduces stream pollution proportionately but, by my invention, substantially complete neutralization may be accomplished almost as easily.

For most cases, I find that from 5 to 20 lbs. of cement-kiln dust will serve for the neutralization of 1000 gallons of acid waste waters, or, at least, a material reduction in their acidity. In a particular example, 12.8 lbs. of flue dust was sufficient when added to the waters and subjected to limited agitation. The sludge resulting from the reaction settles rapidly and, when collected, readily releases water adhering thereto so that handling incident to removal is not a serious problem. The volume of sludge is much less, furthermore, than that produced in neutralization by lime, i.e., about one-seventh, although the total amount of flue dust needed is greater. The only effect of the latter on cost is that of handling since the dust is otherwise a waste product.

It is significant that the high alkaliniy of cement-kiln flue dust, which precludes recycling it into the cement-product stream, is advantageous in efficient neutralization of acid waste waters. A further favorable quality is that the dust is not composed of impalpable fines but has a gritty character. This insures ample area of contact between dust particles and waste waters, ready mixture thereof, and appears to be responsible for the rapid settling of the sludge and its free release of adherent water.

My invention has the further advantage of noticeably reducing the iron salts dissolved in the waste waters. This is of special interest in the treatment of spent pickle liquor.

Streams in coal-mining regions can become polluted by the flow of acid drainage from mines where sulfur-bearing materials are exposed to air and water.

When sulfur-bearing material in the form of iron sulfide is exposed to air in the presence of water vapor, an oxidation recation theoretically takes place where the iron sulfide is oxidized to ferrous sulfate and sulfuric acid as follows:

$$2FeS_2 + 2H_2O + 7O_2 \rightarrow 2FeSO_4 + 2H_2SO_4$$

Water that percolates into a coal mine from the surface leaches and dissolves the products of oxidation and transports them out of the mine and eventually into a stream. During transportation to the stream, two other reactions probably take place. The first reaction is the oxidation of the ferrous iron to ferric iron as shown in the following equation.

$$4FeSO_4 + 2H_2SO_4 + O_2 \rightarrow 2Fe_2(SO_4)_3 + 2H_2O$$

The second reaction is the precipitation of the ferric iron in combination with hydroxyl ion of water to form ferric hydroxide as follows:

$$Fe_2(SO_4)_3 + 6H_2O \rightarrow 2Fe(OH)_3 + 3H_2SO_4$$

This ferric hydroxide is probably more of a complex than the reaction shows. This material is red, yellow, or brown and is commonly referred to as "yellow boy" when deposited along the banks of a stream. Unsightly yellow boy is one of the main contaminants of mine drainage. The other is sulfuric acid.

The most common method for the elimination of these pollutants has been netralization with lime. The mine-acid water is mixed with a slurry of lime to neutralize the acid and form an insoluble iron compound according to the following reaction.

$$FeSO_4 + H_2SO_4 + 2Ca(OH)_2 \rightarrow 2CaSO_4 + Fe(OH)_2 + 2H_2O$$

The products of neutralization are generally aerated to oxidize the ferrous hydroxide to ferric hydroxide, which has much better settling characteristics for separation from the water.

$$4Fe(OH)_2 + 2H_2O + O_2 \rightarrow 4Fe(OH)_3$$

The accumulated sludge from the neutralization system then consists mainly of calcium sulfate and ferric hydroxide. Local stream-pollution-control regulations now require that all discharges from mines must have a pH between 6 and 8 and an iron content of less than 7 milligrams per liter (mg./l.).

To date, the only generally practical means of treating mine-acid drainage has been to neutralize it with lime. This is relatively costly and requires the disposal of large quantities of sludge. The sludge is very wet and difficult to handle. In many cases, the location of disposal sites presents a serious problem when settling ponds becomes full. Because of the disadvantages of conventional lime neutralization, I have investigated the feasibility of neutralization, I have investigated the feasibility of neutralizing drainage with cement-kiln flue dust. The flue dust is a waste product in some plants because of its high alkali content; this makes it unsuitable for recycling to the cement kilns. The dust is presently collected in a baghouse or electrostatic precipitator (not shown) and trucked away for disposal.

Tests were conducted on neutralization with both lime and cement-kiln flue dust to compare the quantities required, reaction time, quantity of sludge produced, sludge-settling characteristics, effects of aeration on oxidation for iron removal, and sludge filterability.

In these tests, one-liter samples of acid mine drainage (AMD) were neutralized by the addition of lime until a pH of 7.0 was attained.

The samples were continuously mixed by means of a magnetic stirrer of the type Fleximix 14–510–100 manufactured by Fisher Scientific Co., Pittsburgh, Pa. and the pH was monitored with an expanded-scale pH meter of the type 200–992–041–925–6–024 manufactured by Leeds and Northrup Co., North Wales, Pa. The volume of settleable solids produced was then measured after two hours settling time. Total iron was determined prior to neutralization and immediately after the settleable-solids tests were concluded, according to a standard procedure, such as "Standard Method for the Examination of Water and Wastewater" twelfth edition, American Public Health Association, Inc., New York 1965.

The above tests were repeated with cement-kiln flue duests from various cement plants.

The pH was measured versus time to enable a comparison of the neutralization reaction times of lime and the various cement-kiln flue dusts. These tests were conducted in the same manner as those for determining the quantities of settleable solids produced.

Settling-rate tests were performed as follows: Identical one-liter samples of acid mine drainage were neutralized with lime and cement-kiln flue dust. To each of six one-liter samples was added to quantity of lime or cement-kiln flue dust predetermined. The samples were then stirred on a gang stirrer of the type 77–903 manfactured by Phipps & Bird for 20 minutes at 100 r.p.m., and allowed to settle. Samples comprising 250 milliliters were drawn from each beaker after various time intervals, and the suspended matter was determined.

A study of the amount of cement-kiln flue dust required to attain a pH of 7.0 was made by adding various weights of dust to six one-liter samples and measuring the pH of each after two hours stirring on the gang stirrer. The data were then plotted by using pH versus weight of cement-kiln flue dust.

To confirm the results of these batch tests on continuous operation, a small pilot plant was set up to neutralize acid mine drainage with cement-kiln flue dust, as shown in FIG. 1 utilizing a slurry because of the small quantities involved. Acid mine water was pumped from a storage tank 10 by a pump 12 into a reaction tank 14 along with a slurry of cement-kiln flue dust pumped by a pump 16 from a storage tank 18 to the reaction tank 14. The flowing mixture was continuously agitated and oxidized by air diffused into the bottom of the reaction tank 14 from an inlet line 20. In the initial testing, mixing was done by mechanical stirring and the sludge formed was a ferrous hydroxide precipitate, leaving some soluble ferrous iron to be oxidized. Since this was not a desirable result, air was introduced to effect oxidation and agitation in one operation so that the amount of soluble iron in the effluent stream would be reduced. The neutralized mixture was then pumped into a settling tank 22 by a pump 24 with approximately one-half hour detention time, where the sludge 26 was separated from the flowing stream. In order to monitor the pH value of the effluent water leaving the settling tank 22 through line 28 for a tank 30, a pH meter 32 of the type 200–992–041–925–6–024 manufactured by Leeds and Northrup Co. is used. Pump 32 may remove, recycle or drain the sludge 26.

Figure 3:
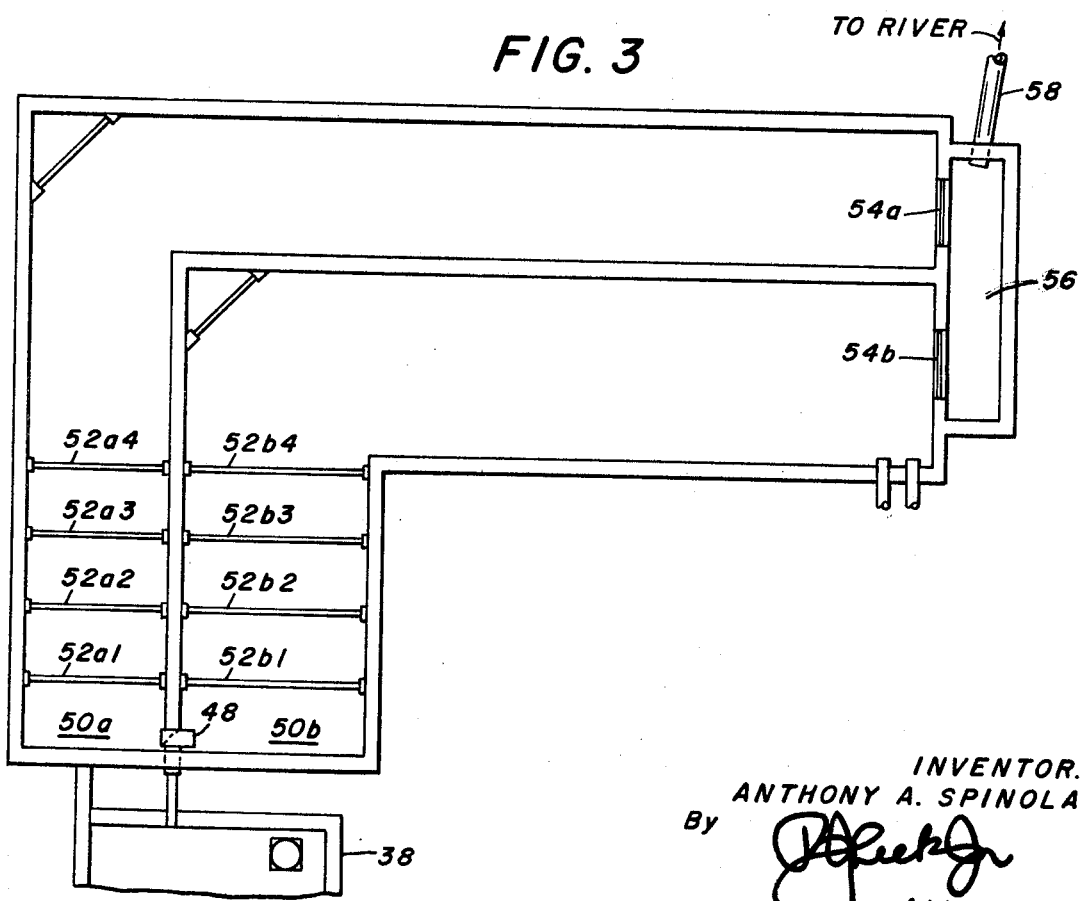
FIGS. 2, 3 are a diagram of a mine acid drainage neutralizing plant of the dry-feed system type.
Figure 2:
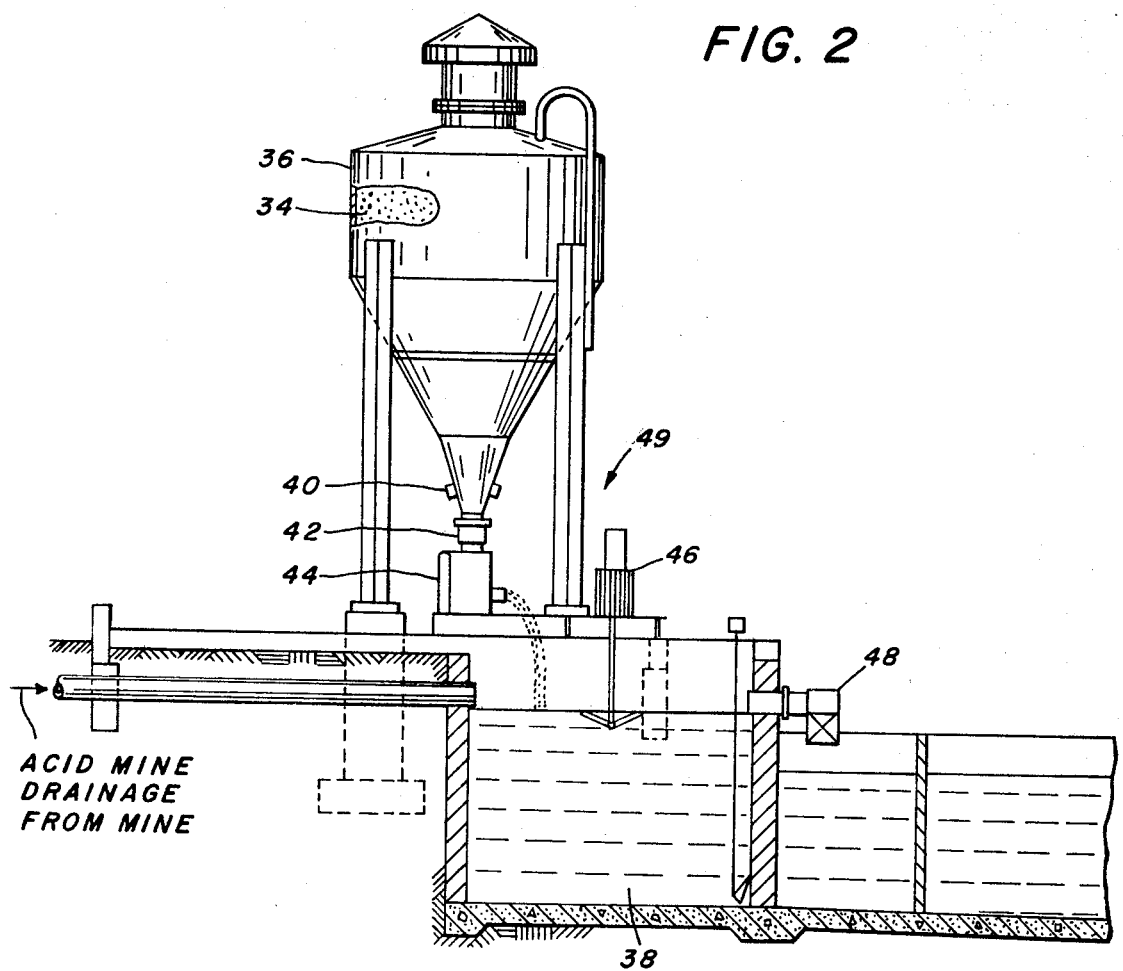

The next phase of testing was conducted at the 250 gallons per minute (g.p.m.) acid-neutralization plant at a mine to compare lime and cement-kiln flue dust neutralization on a full scale operation. This plant, shown in FIG. 2, is designed to dry-feed the neutralizing material, or cement-kiln flue dust 34 from a tank 36 directly into the mixing aeration chamber 38 by means of electric vibrators 40, a bin gate 42 and a screw type feeder 44 from a three-ton hopper. The mixer-aerator 46 of the type Turiport manufactured by U.S. Motors, Pittsburgh, Pa. is capable of adding 5.25 pounds of oxygen per hour into the acid mine drainage. The overflow from the chamber 38 passes through a flow diverter 48, which permits the flow to go into either of two settling basins, 50a, 50b as shown in FIG. 3. Each basin 50a, 50b is equipped with four baffles 52a1–52a4 and 52b1–52b4 respectively intended to keep most of the settled sludge near the feed end of the basin 50a, 50b. The effluent discharges through overflow weirs 54a, 54b (FIG. 3) into another basin 56 and then through a discharge pipe 58 to a river.

During the tests, lime was used as the neutralizing agent for the first few days of operation, after which cement-kiln flue dust was substituted. Tests were conducted to determine pH, iron concentration, and turbidity in the effluent. The lime and flue dust feed rates were measured.

Sludge samples from both lime and flue dust neutralization were analyzed to determine filtering characteristics according to a standard procedure such as Dorr-Oliver Bulletin No. 251LT, "Determination of Filtration Characteristics of any Given Slurry by Laboratory Test Leaf."

Table I below contains analyses of several samples of acid mine drainage from a main bore hole of R mine, to show the composition and variability of contaminate concentrations.

TABLE I.—ANALYSIS OF R MAIN BORE-HOLE ACID MINE DRAINAGE

| Sample | pH | Total Fe | Fe++ | Fe+++ | Al | Ca | Mg | Na | K | Cl | Mn | SO₄= | Acidity as CaCO₃ | Suspended Solids | Soluble Solids | Total Solids |
|---|---|---|---|---|---|---|---|---|---|---|---|---|---|---|---|---|
| A | 3.05 | 543 | 454 | 89 | 70 | 322 | 136 | 1,176 | 60 | 179 | 8 | 4,911 | 1,467 | | | |
| B | 2.99 | 433 | 354 | 79 | 57 | 296 | 109 | 985 | 16 | 146 | 9 | 4,218 | 1,265 | | | |
| C | 2.65 | 454 | 129 | 325 | 34 | 296 | 180 | 995 | <1 | 162 | 8 | 4,355 | 1,225 | 100 | 7,080 | 7,348 |
| D | 2.78 | 269 | 27 | 241 | 45 | 290 | 177 | 840 | <1 | 150 | 7 | 3,602 | 821 | 268 | 5,817 | 6,070 |
| E | 2.85 | 470 | 205 | 264 | 35 | 289 | 176 | 1,035 | <1 | 148 | 8 | 4,241 | 1,097 | 253 | 6,891 | 7,139 |
| F | 2.70 | 309 | 26 | 283 | 36 | 245 | 149 | 750 | <1 | 128 | 7 | 3,273 | 841 | 248 | 5,263 | 5,585 |
| G | 2.75 | 352 | 115 | 237 | 38 | 249 | 151 | 765 | <1 | 162 | 7 | 3,603 | 976 | 322 | 5,840 | 6,112 |
| H | 2.80 | 474 | 199 | 275 | 38 | 302 | 183 | 995 | <1 | 158 | 8 | 4,480 | 1,262 | 272 | 7,342 | 7,633 |
| I | 2.80 | 438 | 236 | 203 | 36 | 280 | 170 | 910 | <1 | 137 | 7 | 4,205 | 1,212 | 291 | 6,750 | 7,017 |
| J | 2.75 | 316 | 75 | 242 | 44 | 251 | 152 | 700 | <1 | 145 | 7 | 3,306 | 941 | 267 | 5,351 | 5,602 |
| K | 2.86 | 422 | 176 | 246 | 31 | 284 | 108 | 700 | <1 | 130 | 8 | 4,210 | 1,151 | 251 | 6,484 | 6,729 |
| L | 2.90 | 411 | 142 | 269 | 33 | 271 | 100 | 570 | <1 | 100 | 8 | 4,059 | 1,146 | 245 | 6,043 | 6,270 |
| M | 2.69 | 336 | 40 | 296 | 30 | 237 | 85 | 420 | <1 | 87 | 7 | 3,349 | 926 | 227 | 5,012 | 5,273 |
| N | 2.91 | 375 | 121 | 254 | 18 | 262 | 93 | 615 | <1 | 110 | 7 | 3,718 | 966 | 261 | 5,757 | 6,007 |
| O | 2.84 | 471 | 141 | 330 | 27 | 284 | 103 | 660 | <1 | 93 | 8 | 4,190 | 1,225 | 250 | 6,531 | 6,861 |
| P | 2.79 | 418 | 128 | 290 | 32 | 283 | 104 | 660 | <1 | 119 | 8 | 4,087 | 1,106 | 330 | 6,323 | 6,590 |
| Q | 3.03 | 352 | 1.4 | 350 | 28 | 224 | 82 | 735 | <1 | 93 | 6 | 3,133 | 827 | 267 | 4,934 | 5,239 |
| R | 3.20 | 455 | 117 | 338 | 36 | 295 | 111 | 1,070 | <1 | 117 | 8 | 4,518 | 1,300 | 305 | 7,225 | 7,528 |
| S | 3.25 | 421 | 70 | 351 | 33 | 282 | 102 | 975 | <1 | 110 | 9 | 4,160 | 1,160 | 303 | 6,654 | 6,984 |
| T | 3.20 | 414 | 42 | 372 | 35 | 278 | 102 | 920 | <1 | 111 | 7 | 4,152 | 1,146 | 330 | 6,642 | 6,982 |
| U | 3.23 | 386 | 0 | 386 | 31 | 260 | 92 | 955 | <1 | 107 | 7 | 3,830 | 986 | 340 | 6,032 | 6,354 |
| V | 3.34 | 365 | 90 | 274 | 36 | 273 | 92 | 892 | <1 | 87 | 7 | 3,849 | 1,016 | 322 | 6,029 | 6,312 |
| W | 2.34 | 411 | 0 | 411 | 47 | 303 | 108 | 1,020 | <1 | 47 | 8 | 4,432 | 1,325 | 283 | 7,073 | 7,432 |
| X | 2.41 | 391 | 55 | 335 | 48 | 305 | 109 | 1,085 | <1 | 84 | 8 | 4,499 | 1,285 | 359 | 7,228 | 7,482 |
| Y | 2.41 | 299 | 1.4 | 297 | 38 | 264 | 100 | 905 | <1 | 125 | 6 | 3,777 | 1,016 | 254 | 6,104 | 6,389 |
| Z | 2.39 | 322 | 0 | 322 | 56 | 253 | 103 | 850 | <1 | 115 | 7 | 3,807 | 1,150 | 285 | 6,061 | 6,364 |
| AB | 2.27 | 350 | 3 | 348 | 46 | 268 | 101 | 885 | <1 | 109 | 7 | 3,962 | 1,180 | 303 | 6,302 | 6,612 |
| AC | 2.30 | 358 | 19 | 339 | 52 | 273 | 100 | 915 | <1 | 118 | 7 | 4,049 | 1,146 | 310 | 6,453 | 6,766 |
| AD | 2.32 | 385 | 6 | 379 | 48 | 259 | 101 | 892 | <1 | 122 | 7 | 3,862 | 1,160 | 313 | 6,188 | 6,493 |
| High | | 543 | 454 | 411 | 70 | 371 | 226 | 1,176 | | 179 | 9 | 4,911 | 1,467 | 305 | 7,342 | 7,633 |
| Average | 2.8 | 387 | 99 | 288 | 40 | 278 | 123 | 850 | <1 | 119 | 7 | 4,000 | 1,100 | 884 | 6,270 | 6,570 |

Among these contaminants are ferrous and ferric iron that must be removed to concentrations under State requirements (7.0 mg./liter total iron in the effluent stream), and total acidity, which include the hydrolyzing salts such as ferric and aluminum sulfate, as well as sulfuric acid.

Table II (below) shows analyses of several samples of drainage from K mine. This drainage contains much less acid and iron than that from R mine.

TABLE II.—ANALYSIS OF K MINE DRAINAGE

| Sample | pH | Total Fe | Fe++ | Fe+++ | SO₄ | Acidity as CaCO₃ | Suspended Solids |
|---|---|---|---|---|---|---|---|
| BC | 6.9 | 31 | 0 | 31 | 1,770 | (¹) | 70 |
| BD | 6.6 | 35 | 0 | 35 | 1,890 | (¹) | 68 |
| BE | 6.6 | 36 | 0 | 36 | 1,900 | (¹) | 72 |
| BF | 6.3 | 28 | 14 | 14 | 2,310 | 10 | 40 |
| BG | 6.2 | 23 | 13 | 10 | 2,370 | 10 | 38 |

¹ Alkaline.

Table III (below) shows chemical analyses of flue-dust samples received from various plants A–I.

TABLE III.—ANALYSIS OF CEMENT-KILN FLUE DUSTS

| | Samples | | | | | | | | |
|---|---|---|---|---|---|---|---|---|---|
| | CA | CB | CC | CD | CE | CF | CG | CH | CI |
| SiO₂ | 14.37 | 15.99 | 12.60 | 13.76 | 15.15 | 10.94 | 16.32 | 15.3 | 14.2 |
| Total Fe | 1.33 | 0.91 | 1.12 | 1.45 | 1.88 | 1.16 | 2.69 | 2.12 | 2.57 |
| Fe₂O₃ | 1.44 | 0.61 | 1.13 | 1.57 | 1.87 | 0.77 | 2.96 | 1.77 | 2.53 |
| FeO | 0.41 | 0.62 | 0.42 | 0.45 | 0.73 | 0.80 | 0.80 | 1.35 | 0.04 |
| S | 5.74 | 5.15 | | 1.74 | 2.92 | 3.20 | 6.75 | 4.19 | 0.68 |
| Al₂O₃ | 3.68 | 4.97 | 4.36 | 4.14 | 4.96 | 3.40 | 6.87 | 3.47 | 3.58 |
| CaO | 31.71 | 47.12 | 41.47 | 55.44 | 49.62 | 55.68 | 28.73 | 43.64 | 58.20 |
| MgO | 1.11 | 1.82 | 0.70 | 1.63 | 1.68 | 1.55 | 1.17 | 0.90 | 1.11 |
| Na₂O | 0.74 | 0.27 | 0.66 | 0.40 | 0.62 | 0.28 | 1.00 | 0.36 | 0.51 |
| K₂O | 12.05 | 2.73 | 3.83 | 6.44 | 2.86 | 1.78 | 12.61 | 3.31 | 6.52 |

Figure 4:
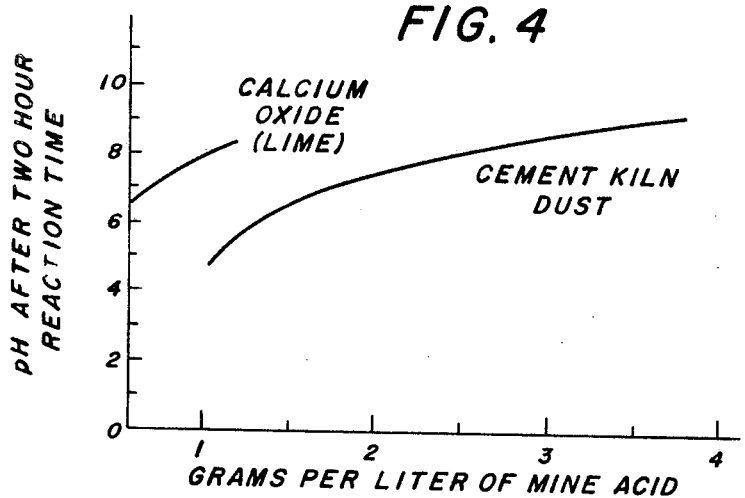
FIG. 4 is a graph showing the relative quantities of calcium oxide (lime) and cement-kiln flue dust needed to neutralize acid mine drainage.

FIG. 4 presents the data obtained on the amount of material required to neutralize R mine acid drainage to various levels of pH. The data show that about 2 grams of cement-kiln flue dust were required per liter of acid mine drainage to achieve a pH of 7.0 as compared with about one gram for calcium oxide. The comparison of reaction times, as shown in Table IV (below), indicated a faster neutralization with the flue dust than with calcium oxide.

TABLE IV.—COMPARISON OF LIME AND CEMENT-KILN DUST NEUTRALIZATION

| Time, Minutes: | pH Acid Mine Drainage After Treatment With CaO [1] | pH Acid Mine Drainage After Treatment With Cement Kiln Dust [1] |
|---|---|---|
| 0 | 2.65 | 2.65 |
| 5 | 4.5 | 5.8 |
| 10 | 6.4 | 6.9 |
| 15 | 6.8 | 7.1 |
| 20 | 7.0 | 7.1 |
| 25 | 7.1 | 7.3 |
| 30 | 7.1 | 7.5 |
| 60 | 7.8 | 7.5 |
| 90 | 7.8 | 7.5 |
| 120 | 7.8 | 7.5 |

[1] One g./l. of CaO and g./l. of cement dust used.

During these tests it was also found that the cement-kiln dust could be dry-fed more readily than lime (calcium oxide). Lime-neutralization systems have usually employed a slurry feed to prevent congealing and caking in the feeding machinery.

Table V shows the resultant pH and iron content after the same acid mine drainage was neutralized with different cement-kiln flue dusts.

TABLE V.—pH AND IRON CONTENTS OF MINE ACID AFTER NEUTRALIZATION WITH VARIOUS WASTE CEMENT DUSTS

R Mine Acid, Initial pH=3.3

| | Dust per Liter of Mine Acid | | | | | |
|---|---|---|---|---|---|---|
| | 1.0 gram | | 2.0 grams | | 4.0 grams | |
| | Iron mg./l. | pH | Iron mg./l. | pH | Iron mg./l. | pH |
| Sample: | | | | | | |
| CE | 3.25 | 6.24 | 3.25 | 6.88 | 0.18 | 10.25 |
| CD | 2.95 | 6.25 | 0.12 | 9.95 | 0.18 | 11.85 |
| CF | 3.40 | 6.58 | 3.25 | 7.26 | 0.21 | 10.59 |
| CB | 2.60 | 6.22 | 2.60 | 6.83 | 0.38 | 9.70 |
| CI | 3.90 | 6.13 | 0.37 | 7.06 | | 11.70 |
| CG | 2.80 | 6.05 | 2.80 | 6.49 | 0.92 | 7.14 |
| CA | 3.00 | 6.05 | 3.20 | 6.36 | 3.00 | 6.82 |
| CJ | 2.25 | 6.10 | 2.25 | 6.42 | 2.80 | 6.86 |
| CH | 2.57 | 6.10 | 2.50 | 6.80 | 2.50 | 7.80 |

It should be pointed out that these results are based on only one sample of dust from each plant and that the neutralizing power of the dust from a given plant might vary with changes in operating practice and/or raw materials.

It was found that for neutralizing to a given pH there is an 82 percent decrease in sludge volume with the flue dust. It was found by neutralizing equal volumes of the same acid mine drainage that the resulting volume of sludge generated with cement kiln flue dust after two hours settling was 11.5 cc. per liter of acid mine drainage. However, the volume of sludge resulting from lime neutralization was 70 cc. per liter after 15 hours. The decrease is due to the formation of a gritty sludge with the flue dust as compared with the very gelatinous, noncompacting precipitate formed with calcium oxide neutralization. Thus, even though a larger weight of cement-kiln flue dust would be required for neutralization as compared with lime neutralization of mine acid, the volume of sludge to be ultimately disposed of would be significantly less. This would reduce transportation costs and would ease the problem of finding space for the sludge disposal.

As shown, a given quantity of dust produced a higher pH with aeration than without it. These test results confirm that aeration should be employed in a neutralization system to achieve better iron removal and to reduce the quantity of flue dust required.

The information gained from the previous batch tests was confirmed in the pilot plant shown in FIG. 1. The pH of the effluent stream from the settling tank 22 was monitored and maintained at about 8.0 with 2.2 grams of cement-kiln flue dust per liter of acid mine drainage (about 18 lb. per 1000 gal.).

From the information gathered in the study on aeration, it was determined that aeration does affect neutralization, both in iron removal and in the quantity of neutralizing agent required. Without aeration, the ferrous iron is not oxidized to the less soluble, faster-settling ferric iron. Table VI show sthe results of the tests conducted to determine the influence of aeration on the neutralization efficiency of cement-kiln flue dust.

TABLE VI.—THE INFLUENCE OF AERATION ON THE NEUTRALIZATION EFFICIENCY OF CEMENT-KILN FLUE DUST

Initial Mine Acid pH=2.9
Volume Treated=1,000 ml.

| | pH After Two Hours | |
|---|---|---|
| | Nonaerated | Aerated |
| Weight of Cement-Kiln Flue Dust, grams: | | |
| 0.5 | 3.4 | 5.8 |
| 1.0 | 4.6 | 6.8 |
| 2.0 | 5.8 | 7.4 |
| 3.0 | 7.3 | 8.0 |
| 3.5 | 8.1 | 8.5 |
| 4.0 | 9.6 | 9.9 |

At the above dust feed rate, the R mine neutralization plant collects about 70 tons per day of flue dust during tons per day of flue dust for neutralization. In comparison with this, the baghouse on the kiln exhaust at a cement plant collects about 70 tons per day of flue dust during peak production.

In appearance, the effluent from the pilot test unit was like that of tap water, and its analysis is shown in Table VII (below).

TABLE VII

Analysis of laboratory pilot-plant effluent [1]

| | Mg. per liter |
|---|---|
| $SiO_2$ | 35 |
| $Al_2O_3$ | 1.5 |
| CaO | 931 |
| MgO | 61 |
| MnO | 8 |
| $Cr_2O_3$ | <1 |
| $P_2O_5$ | 2 |
| $Fe^{++}$ | [2] ND |
| $Fe^{+++}$ | [2] ND |
| $Na_2O$ | 856 |
| $K_2O$ | 42 |
| $SO_4=$ | 3107 |
| $CL-$ | 96.3 |
| Dissolved solids | 4758 |

[1] The components reported in the analysis are not necessarily in that form.
[2] None determined.

As shown, the iron removal was excellent. At the time of the test program to study neutralization with cement-kiln flue dust, the neutralization plant at the K mine had recently been placed in operation. Tests were conducted at this plant to gain an indication of the performance of the flue dust in a full-scale operation. Even though the K mine drainage is very low in acid and iron contamination and would not be representative of the more serious problem at the R mine, it was believed that certain aspects of the laboratory study of flue dust versus line could be checked.

Tables VIII and IX show the results of the tests at the K mine using lime and cement-kiln flue dust, respectively.

TABLE VIII.—RESULTS OF TESTS USING LIME AT K MINE NEUTRALIZATION PLANT

| Test No.: | Dust Feeder Setting, percent | Pounds Lime per 1,000 gal. water | Influent | | | Effluent | | |
|---|---|---|---|---|---|---|---|---|
| | | | pH | Total Iron, mg./l. | Turbidity, JTU [1] | pH | Total Iron, mg./l. | Turbidity, JTU |
| LA | 20 | 0.96 | 6.4 | 37 | 235 | 7.9 | 5.2 | 55 |
| LB | 20 | 0.96 | 6.3 | 37 | 265 | 7.7 | 5.2 | 58 |
| LC | 20 | 0.96 | 6.3 | 28 | 290 | 7.1 | 8.8 | 50 |
| LD | 20 | 0.96 | 5.6 | 42 | 270 | 6.6 | 21.5 | 45 |
| LE | 35 | 1.69 | 6.5 | 24 | 435 | 6.6 | 27.0 | 62 |
| LF | 50 | 2.59 | 6.4 | 33 | 240 | 8.1 | 8.5 | 48 |
| LG | 50 | 2.59 | 6.4 | 35 | 225 | 9.2 | 5.3 | 25 |
| LH | 25 | 1.21 | 6.7 | 19 | 290 | 8.5 | 5.3 | 50 |

[1] Jackson Turbidity Units.

TABLE IX.—RESULTS OF TESTS USING CEMENT-KILN FLUE DUST AT K MINE NEUTRALIZATION PLANT

| Test No.: | Dust Feeder Setting, percent | Pounds Dust per 1,000 gal. water | Influent | | | Effluent | | |
|---|---|---|---|---|---|---|---|---|
| | | | pH | Total Iron, mg./l. | Turbidity, JTU [1] | pH | Total Iron, mg./l. | Turbidity, JTU |
| KA | 30 | 2.61 | 6.2 | 27 | 320 | 7.1 | 8.0 | 62 |
| KB | 30 | 2.61 | | | | 7.2 | 7.5 | 58 |
| KC | 30 | 2.61 | 6.3 | 33 | 300 | 7.4 | 6.4 | 60 |
| KD | 30 | 2.61 | 6.1 | 46 | 255 | 7.4 | 7.6 | 75 |
| KE | 30 | 2.61 | | | | 7.3 | 7.5 | 65 |
| KF | 30 | 2.61 | | | | 7.2 | 7.5 | 70 |
| KG | 48 | 4.18 | 6.7 | 104 | 2,680 | 6.9 | 10.6 | 112 |
| KH | 48 | 4.18 | 6.3 | 30 | 285 | 7.6 | 6.5 | 85 |
| KI | 48 | 4.18 | 6.3 | 33 | 280 | 7.6 | 5.5 | 85 |
| KJ | 48 | 4.18 | 6.5 | 30 | 300 | 8.4 | 4.8 | 85 |
| KL | 48 | 4.18 | 6.6 | 37 | 275 | 9.4 | 2.1 | 30 |
| KM | 48 | 4.18 | 6.5 | 25 | 500 | 9.3 | 2.3 | 25 |
| KN | 48 | 4.18 | 6.3 | 38 | 325 | 9.1 | 6.5 | 38 |
| KO | 48 | 4.18 | 6.1 | 26 | 450 | 8.0 | 3.3 | 22 |
| KP | 48 | 4.18 | 6.0 | 90 | 75,000 | 8.1 | 13.0 | 165 |

[1] Jackson Turbidity Units.

These results show that either lime or the flue dust has the capability of reducing iron in the effluent to below the State requirement of 7 mg./liter. The effluent turbidity was reduced to about the same range of values with either material. For both test materials the flow of mine drainage averaged about 150 g.p.m. The feed rate for lime varied from 7.2 to 18.1 lb./hr. (0.8 to 2.0 lb. per 1000 gal. of water).

Because the feed system for the neutralizing material at the K mine plant is set to feed for a given percentage of the time, there are no provisions to correct for surges in iron or pH. Such a surge occurred during test No. 15 (Table IX) when mining was begun in a new area, and a pocket of coal refuse and acid mine drainage that had probably aged for years was released. Another surge occurred during test No. 23 (Table IX), when a deposit of clay was uncovered and passed into the neutralizing plant, resulting in a heavier concentration of contaminants. During these periods the quality of the effluent water was adversely affected.

The settling tanks 50a, 50b, FIG. 3, were designed to have a detention time of approximately 1.75 hours. During the test program this was checked by a technique of dying the influent and noting the time for the dye to appear in the effluent. The detention time by this procedure was found to be less than 45 minutes. Baffles 52a1–52a4 and 52b1–52b4 that were submerged 18 inches below the surface were then installed across the tanks 50a, 50b. This helped reduce channeling, but to increase the detention time further, both tanks 50a, 50b were used as one settling basin by splitting the flow by means of the flow diverter 48 into the two tanks 50a, 50b with the baffles 52a1–52a4 and 52b1–52b4 remaining in place. This increased the detention time enough to settle more solids from the effluent stream and reduce the turbidity.

In general, the test program conduced on the K mine neutralization plant confirmed that cement-kiln flue dust is excellent for treating acid mine drainage. In particular, it was demonstrated that the flue dust can be fed in a dry state much more reliably than lime, which tends to cake.

Samples of the sludge produced at the K mine, both with lime and with cement-kiln flue dust, were filter tested. The test results are shown in Table X (below).

TABLE X.—SLUDGE-FILTRATION TEST RESULTS

| Type of Neutralization | Vacuum, in. Hg | Filter Time, min. | Drying Time, min. | Cake Solids, percent | Cake Thickness, in. | Filtration Rate, lb./hr./ft.[2] |
|---|---|---|---|---|---|---|
| Lime | 8 | 1 | 2 | 19.2 | 1/16 | 0.2 |
| Do | 16 | 1 | 2 | 21.3 | 3/32 | 0.2 |
| Do | 20 | 1 | 2 | 21.3 | 5/64 | 0.2 |
| Cement-Kiln Flue Dust | 8 | 1/2 | 2 | 35.6 | | 9.4 |
| Do | 8 | 1 | 2 | 35.8 | | 6.5 |
| Do | 8 | 2 | 2 | 36.8 | | 6.2 |
| Do | 16 | 1/4 | 2/3 | 37.3 | 3/16 | 20.1 |
| Do | 16 | 1/2 | 1 | 37.7 | 1/4 | 16.8 |
| Do | 16 | 1 | 2 | 37.7 | 5/16 | 10.8 |
| Do | 20 | 1/4 | 2/3 | 38.6 | 1/8 | 19.6 |
| Do | 20 | 1/2 | 1 | 37.3 | 3/16 | 16.3 |
| Do | 20 | 1 | 2 | 37.6 | 1/4 | 10.6 |

As shown the flue-dust sludge resulted in a considerably drier filter cake (about 37% solids) than did the lime-produced sludge (about 20% solids). The flue-dust filter cake was thus lower in volume and easier to handle. Also, the flue-dust sludge flowed readily from the filter whereas the lime sludge did not. As shown also in Table X, for a given filter and drying time (for example, 1 minute and 2 minutes, respectively) the filtration rate was much greater for the flue-dust sludge than for the lime sludge at each of the three filter vacuums tested. These results indicate that the sludge from a flue-dust neutralization system can be dewatered by vacuum filtration to facilitate disposal. The sludge from lime neutralization, on the other hand, is known to be difficult to filter, not only from the results of the current tests, but also from past experience on operating systems.

Table XI (below) shows a typical analysis of sludge produced from Type B cement kiln flue-dust neutralization of acid mine drainage.

TABLE XI

Analysis of Sludge Produced from Type B Cement Kiln Flue Dust Neutralization of Acid Mine Drainage

|  | Percent by Weight |
|---|---|
| $SiO_2$ | 13.71 |
| Total Iron | 10.78 |
| $Fe_2O_3$ | 14.50 |
| FeO | 0.82 |
| $Al_2O_3$ | 5.85 |
| CaO | 27.44 |
| MgO | 1.55 |
| $Na_2O$ | 0.50 |
| $K_2O$ | 1.64 |
| $Li_2O$ | 0.01 |
| MnO | 0.33 |
| $P_2O_5$ | 0.11 |
| S | 3.12 |
| Moist | 4.57 |
| Combined Water | 4.46 |
| $SO_4$ | 14.13 |
| Cl | 0.10 |

Table XII (below) shows a typical analysis of sludge produced from type C cement kiln flue dust neutralization of acid mine drainage.

TABLE XII

Analysis of Sludge Produced from Type C Cement Kiln Flue Dust Neutralization of Acid Mine Drainage

| $SiO_2$ | 14.80 |
|---|---|
| Total Iron | 16.12 |
| $Fe_2O_3$ | 22.76 |
| FeO | 0.25 |
| $Al_2O_3$ | 8.41 |
| CaO | 20.44 |
| MgO | 0.35 |
| $Na_2O$ | 0.95 |
| $K_2O$ | 0.81 |
| $Li_2O$ | 0.01 |
| MnO | 0.12 |
| $P_2O_5$ | 0.08 |
| S | 1.0 |
| Moist | 3.79 |
| Combined Water | 1.15 |
| $SO_4$ | 10.59 |
| Cl | .87 |

Alternative embodiments
(dewatering sludge)

Figure 5:
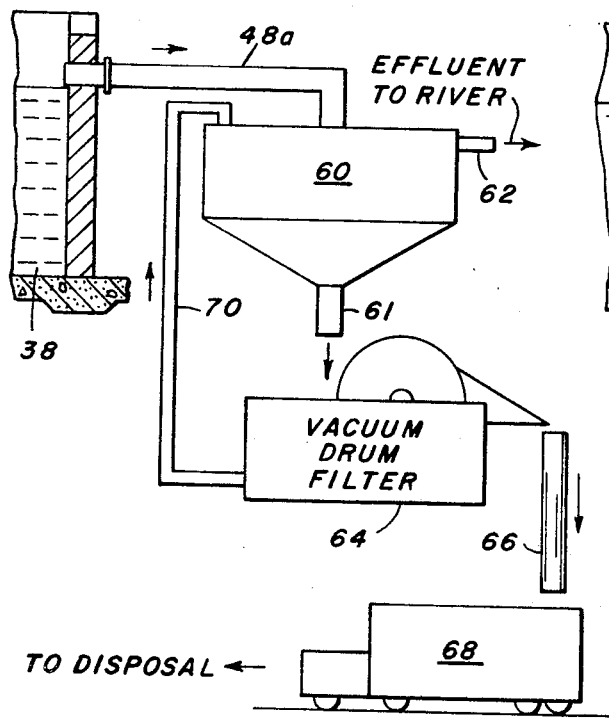
FIG. 5 is a schematic view of apparatus for thickening and dewatering the sludge after it leaves the neutralizing apparatus and shows a thickener and drum type filter.

In FIG. 5 the neutralized acid mine water leaving pipe 48a of the neutralizing apparatus 49 enters a thickener 60 of the type B manufactured by Eimco, Salt Lake City, Utah, where the sludge is thickened and the effluent is sent to the river by pipe 62. Thereafter the sludge via pipe 61 enters a filter 64 of the vacuum drum type similar to that manufactured by Eimco where the sludge is dewatered and is dropped by gravity through a chute 66 into a truck 68. Pipe 70 recycles the water from the filter 64 to the thickener 60.

Figure 6:
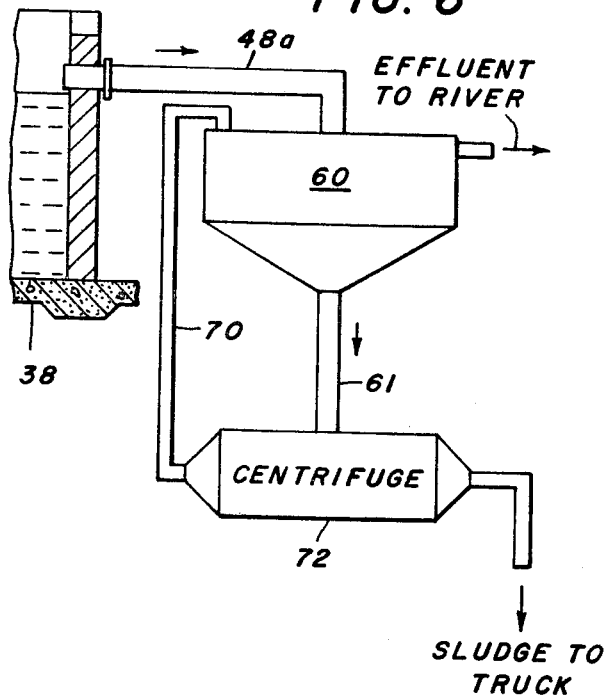
FIG. 6 is a schematic view similar to FIG. 5 showing the use of a thickener and a centrifuge.

In FIG. 6 a centrifuge 72 replaces the filter 64 (FIG. 5).

Figure 7:
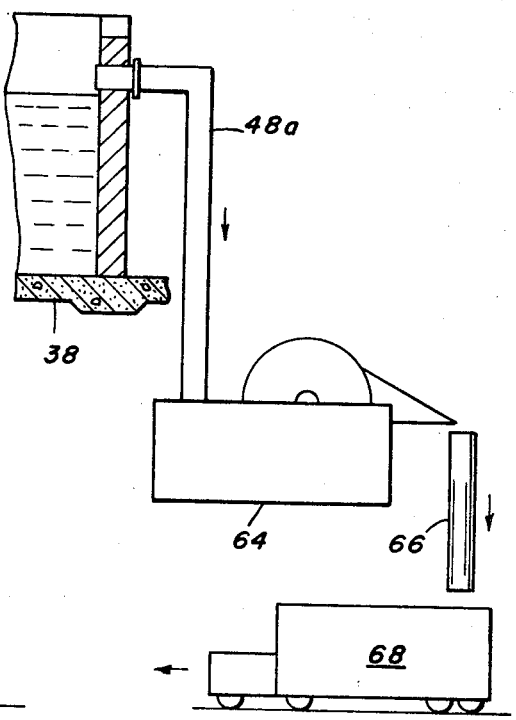
FIG. 7 is a view similar to FIGS. 5, 6 showing the use of a drum type filter.

Those skilled in the art will realize that the discharge from pipe 61 in FIGS. 6, 7 can be dumped onto a field or the like (not shown) and dried in the atmosphere.

FIG. 7 eliminates the thickener 60 and utilizes the drum filter 64.

Figure 8:
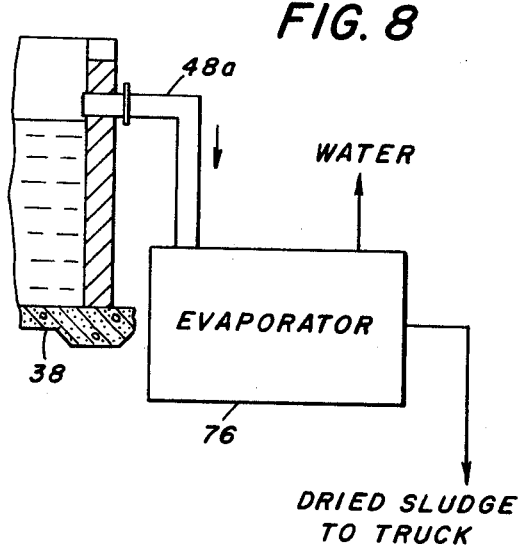
FIG. 8 is a view similar to FIGS. 5–7 showing the use of an evaporator.

In FIG. 8 an evaporator 76 of the tube type manufactured by Swenson Evaporator Co., Division of Whiting Corporation, Harvey, Ill., dewaters the neutralized mine water.

BRIEF SUMMARY OF THE ACHIEVEMENTS OF THE INVENTION

It will be understood by those skilled in the art that the improved method of this invention provides a cheaper neutralizing agent than conventional lime; produces a more compact sludge than the sludge volume produced with lime; produces a sludge which can be filtered and readily separated from the sludge slurry; provides a filtered sludge which can be reused for a soil conditioner or for raw material for the manufacture of cement manufacture or the like; provides a sludge from which iron and sulphur may be recovered; and utilizes a dry feed.

While in accordance with the patent statutes preferred and alternative embodiments of this invention have been illustrated and described in detail, it is to be particularly understood that the invention is not limited thereto or thereby.

I claim:
1. A method of neutralizing acid drainage having:
(a) a pH of about 2.27 to 3.05;
(b) a total Fe content of about 269 to 543 p.p.m.;
(c) an Al content of about 18 to 70 p.p.m.;
(d) a Ca content of about 245 to 371 p.p.m.;
(e) an Mg content of about 82 to 226 p.p.m.;
(f) an Na content of about 420 to 1176 p.p.m.;
(g) a K content of about 0 to 60 p.p.m.;
(h) a Cl content of about 47 to 179 p.p.m.;
(i) an Mn content of about 0 to 10 p.p.m.;
(j) an $SO_4$ content of about 3000 to 5000 p.p.m.;
(k) an acidity content as $CaCO_3$ of about 100 to 3000 p.p.m.;
(l) a suspended solids content of about 100 to 884 p.p.m.;
(m) a soluble solids content of about 5000 to 7342 p.p.m.;
(n) a total solids content of about 5100 to 8226;
comprising the step of adding thereto cement kiln flue dust having:
(a) an $SiO_2$ content of about 10.94 to 16.32% by weight;
(b) a total Fe content of about 0.91 to 3.12% by weight;
(c) an $Fe_2O_3$ content of about 0.61 to 2.96% by weight;
(d) an FeO content of about 0.04 to 1.35% by weight;
(e) an S content of about 0.68 to 6.75% by weight;
(f) an $Al_2O_3$ content of about 3.40 to 6.87% by weight;
(g) a CaO content of about 28.73 to 58.20% by weight;
(h) an MgO content of about 0.7 to 1.82% by weight;
(i) an $Na_2O$ content of about 0.27 to 1.00% by weight;
(j) a $K_2O$ content of about 1.78 to 12.61% by weight;
to neutralize said acid drainage to form a sludge product including neutralized acid water and a sludge having:
(a) an $SiO_2$ content of about 13.71 to 14.80% by weight;
(b) a total Fe content of about 10.78 to 16.12% by weight;
(c) an $Fe_2O_3$ content of about 14.50 to 22.76% by weight;
(d) an FeO content of about 0.25 to 0.82% by weight;
(e) an $Al_2O_3$ content of about 5.85 to 8.41% by weight;
(f) a CaO content of about 20.44 to 27.44% by weight;
(g) an MgO content of about 0.35 to 1.55% by weight;
(h) an $Na_2O$ content of about 0.5 to 0.95% by weight;

(i) a $K_2O$ content of about 0.81 to 1.64% by weight;
(j) an $Li_2O$ content of about 0.0 to 0.01% by weight;
(k) an MnO content of about 0.12 to 0.33% by weight;
(l) a $P_2O_5$ content of about 0.08 to 0.11% by weight;
(m) an S content of about 1.0 to 3.12% by weight;
(n) an $SO_4$ content of about 10.59 to 74.13% by weight;
(o) a Cl content of about 0.1 to 0.87% by weight; and
(p) a moisture content of about 3.79 to 4.57% by weight.

2. The method recited in claim 1 wherein about 5 to 20 pounds of said cement kiln flue dust is added to each one thousand gallons of acid drainage.

3. The method recited in claim 1 wherein about 13 pounds of said cement kiln flue dust is added to each one thousand gallons of acid drainage.

4. The method recited in claim 1 and including the step of settling said sludge product.

5. The method recited in claim 1 and including the step of agitating said acid drainage and cement kiln flue dust.

6. The method recited in claim 1 and including the step of aerating said acid drainage and cement kiln flue dust.

7. The method recited in claim 1 including the step of thickening the sludge product.

8. The method recited in claim 1 wherein the sludge product is thickened by settling said sludge.

9. The method recited in claim 7 including the step of filtering said sludge product.

10. The method recited in claim 1 including the step of dewatering said sludge product by centrifugal action.

11. The method recited in claim 1 including the step of dewatering said sludge product by evaporation.

12. The method recited in claim 1 and including the steps of spreading said sludge product and drying said sludge product in the atmosphere.

References Cited

UNITED STATES PATENTS

| 1,672,584 | 6/1928 | Travers | 210—59 X |
| 2,810,633 | 10/1957 | Cooper | 210—45 X |

OTHER REFERENCES

Gurnham, C. F., Principles of Industrial Waste Treatment, 1955, John Wiley & Sons, Inc., New York, pages 176–186.

MICHAEL E. ROGERS, Primary Examiner

U.S. Cl. X.R.

210—73

UNITED STATES PATENT OFFICE
CERTIFICATE OF CORRECTION

Patent No. 3,511,777                                      May 12, 1970

Anthony A. Spinola

It is certified that error appears in the above identified patent and that said Letters Patent are hereby corrected as shown below:

Column 2, line 6, "neutralizing" should read -- neutralization --. Column 3, line 44, "netralization" should read -- neutralization --; line 69, "comes" should read -- come --; lines 70 and 71, cancel "I have investigated the feasibility of neutralization,". Column 4, line 25, "ducsts" should read -- dusts --; line 34, "to" should read -- the --; line 72, "32" should read -- 32' --. Column 6, Table III, ninth column, line 2 thereof, "2.12" should read -- 3.12 --. Column 8, line 11, "show sthe" should read -- shows the --; line 32, "collects about 70 tons per day of flue dust during" should read -- , with a discharge of 1500 gpm, would require 22.5 --. Column 10, line 45, "conduced" should read -- conducted --.

Signed and sealed this 12th day of January 1971.

(SEAL)
Attest:

EDWARD M. FLETCHER, JR.                          WILLIAM E. SCHUYLER, JR.
Attesting Officer                                        Commissioner of Patents